United States Patent [19]
Euverard et al.

[11] 3,987,911
[45] Oct. 26, 1976

[54] SELF-ALIGNING APPARATUS FOR STACKER-UNSTACKER ELEVATOR

[75] Inventors: Maynard R. Euverard, Clarendon Hills; Henry A. Heide, Addison, both of Ill.

[73] Assignee: Velten & Pulver, Inc., Chicago Ridge, Ill.

[22] Filed: Sept. 11, 1975

[21] Appl. No.: 612,468

[52] U.S. Cl. .............................. 214/8.5 A; 214/6 S; 214/8.5 D; 271/147; 271/164
[51] Int. Cl.² ........................................ B65G 59/04
[58] Field of Search ................... 214/6 DS, 6 H, 6 S, 214/8.5 R, 8.5 A, 8.5 D, 6.5; 271/147, 162, 164, 213

[56] References Cited
UNITED STATES PATENTS

| | | | |
|---|---|---|---|
| 1,948,001 | 2/1934 | Mensman et al. | 271/164 |
| 3,113,683 | 12/1963 | Von Gal | 214/8.5 A |
| 3,180,522 | 4/1965 | Marasso | 214/8.5 R X |
| 3,770,143 | 11/1973 | Breitbach | 214/6 DS |
| 3,933,254 | 1/1976 | Pulver et al. | 214/6 DS |

Primary Examiner—L. J. Paperner
Attorney, Agent, or Firm—Prangley, Dithmar, Vogel, Sandler & Stotland

[57] ABSTRACT

A stacking-unstacking machine for bread pans and the like includes an elevator having pan support means thereon for carrying stacked pans to or away from a stacking-unstacking station, guide means being provided properly to align the pans for the stacking or unstacking operations, and particularly the latter. The pan support means on the elevator include a fixed base and a support platform mounted for low-friction horizontal movement with respect to the base in response to aligning forces exerted on the top of the stack by the guide means. Bias means are provided to urge the movable platform toward a home position.

19 Claims, 9 Drawing Figures

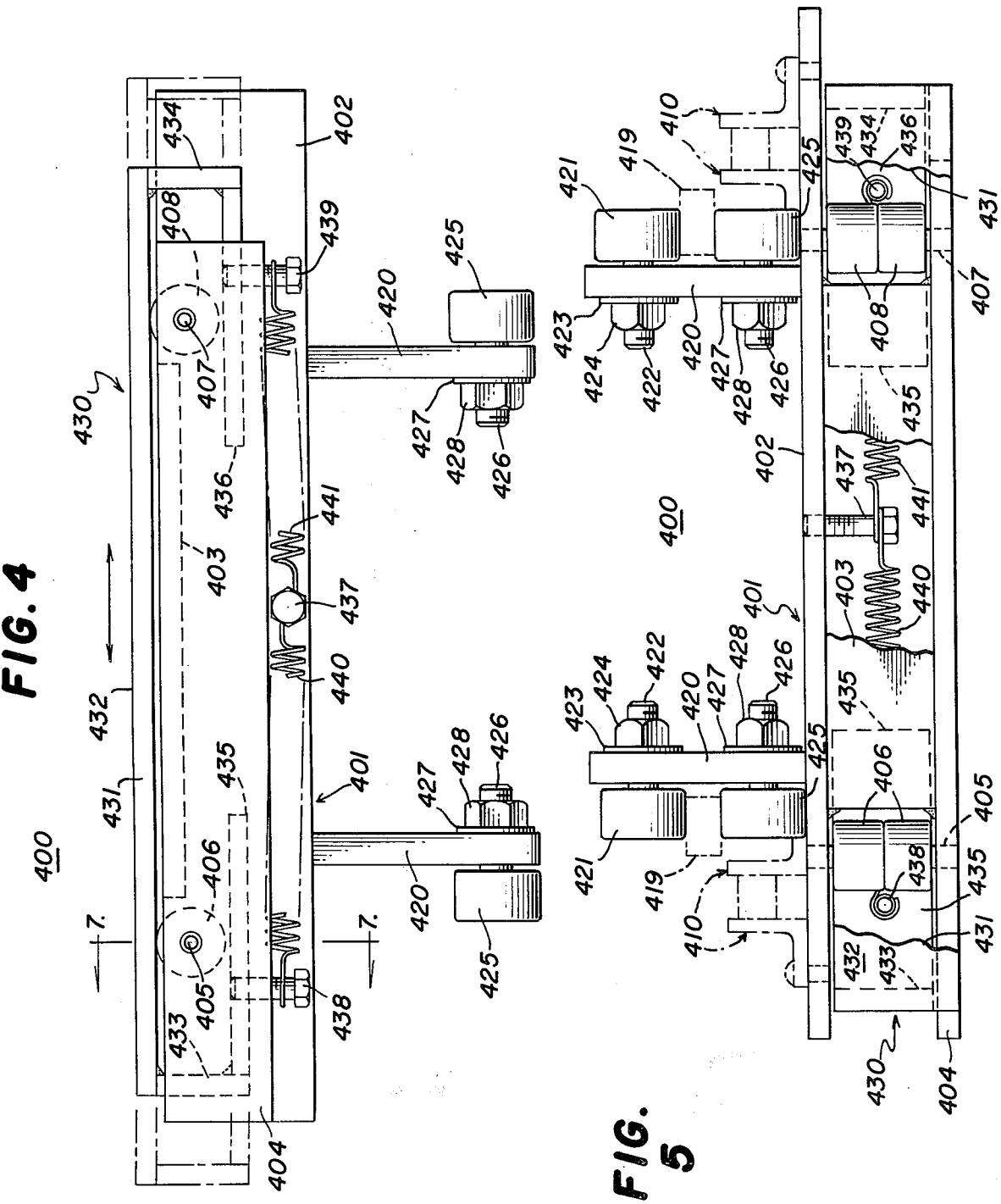

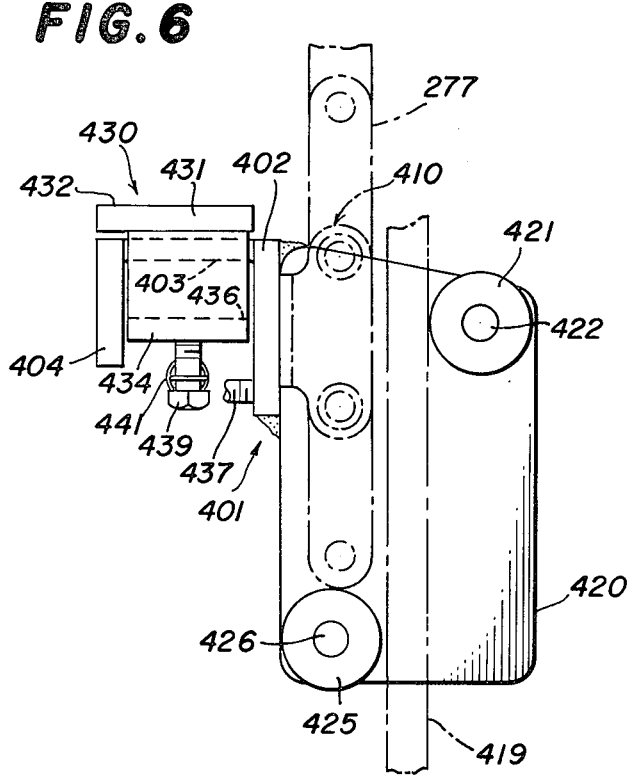
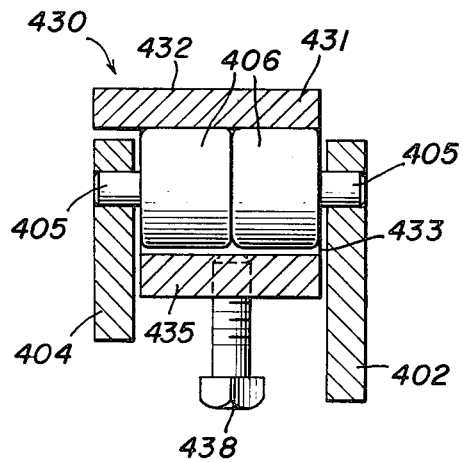
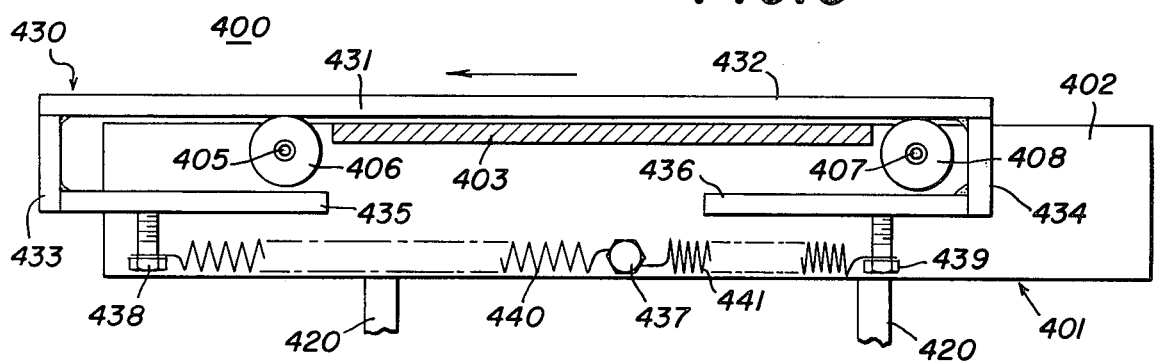
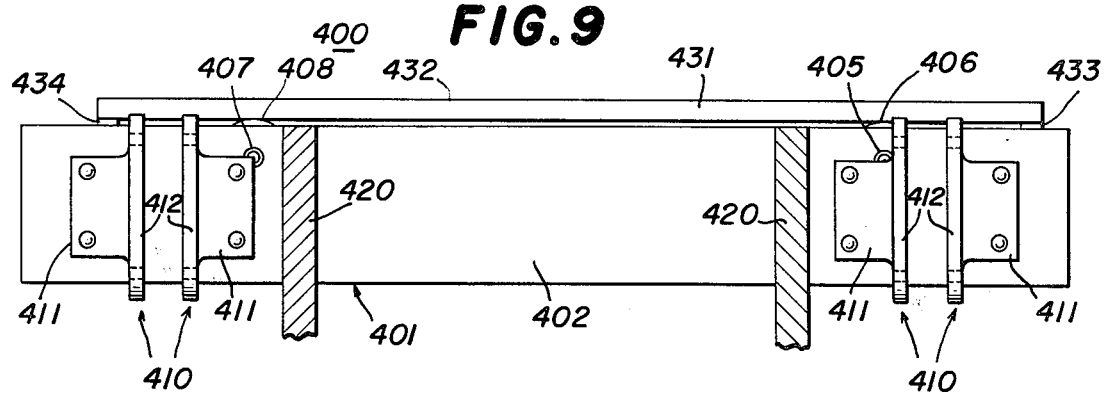

SELF-ALIGNING APPARATUS FOR STACKER-UNSTACKER ELEVATOR

CROSS-REFERENCE TO RELATED APPLICATION

The present invention is an improvement of the "Stacker-Unstacker" disclosed in the copending application of Willis C. Pulver and Henry A. Heide, Ser. No. 339,314, filed Mar. 8, 1973 now U.S. Pat. No. 3,933,254 and assigned to the assignee of the present invention.

BACKGROUND OF THE INVENTION

The present invention relates to machines for stacking and unstacking articles such as baking pans and the like. More particularly, the invention relates to a system and the mechanism therein for selective operation in a pan unstacking mode and in a pan pass-through mode and in a pan stacking mode, and including elevator means for moving a stack of pans incrementally upwardly to a stacking-unstacking station during an unstacking operation as pans are removed from the top of the stack, and for incrementally moving a stack of pans downwardly away from the stacking-unstacking station during a stacking operation as pans are added to the top of the stack.

A machine for performing the stacking and unstacking functions is disclosed in detail in the aforementioned U.S. Application Ser. No. 339,314, and separate machines for respectively performing stacking and unstacking operations are disclosed in the U.S. Pat. No. 3,770,143, issued to J. J. Breitbach on Nov. 6, 1973 and entitled "Apparatus For Transferring Trays Between A Conveyor System And A Stack". In such prior art systems it is important that during the stacking and unstacking operations, and particularly the latter, the stack of pans be properly positioned on the elevator so as to be in proper alignment with the stacking-unstacking station, in order to insure proper operation of the stacking and unstacking apparatus, and in order to insure accurate positioning of the pans on an outfeed conveyor as they are unstacked. However, the prior art systems include no means for insuring the proper alignment of the pan stack with respect to the stacking-unstacking station.

SUMMARY OF THE INVENTION

It is therefore a general object of the present invention to provide means for guiding the pans in a stack into proper alignment with the stacking-unstacking station as they are carried upwardly by the elevator, and at the same time preventing any undesirable buildup of internal stresses in the stack as a result of guiding forces exerted thereon.

More particularly, the present invention includes guide means disposed adjacent to the stacking-unstacking station for engagement with the uppermost pans in a stack carried by the elevator to bring them into proper alignment, the elevator including a movable support platform for carrying the stack and permitting movement of the entire stack into proper alignment under the urging of the guide means.

It is an important object of this invention to provide self-aligning apparatus for moving stackable articles to an unstacking station comprising an elevator, article support means carried by the elevator for generally horizontal movement with respect thereto, the support means being disposed below the unstacking station for supporting a stack of articles, the elevator moving the support means upwardly and toward the unstacking station to permit unstacking of articles from the support means at the unstacking station, and guide means mounted adjacent to the unstacking station for engagement with articles at the top of a misaligned stack as they are moved to the unstacking station by the elevator for deflecting and horizontally moving the articles properly to align them with respect to the unstacking station, the horizontal movement by the guide means of the articles at the top of the misaligned stack on the support means effecting a corresponding horizontal movement of the support means, whereby the entire stack is moved into proper alignment with respect to the unstacking station so as to prevent displacement of the top of the stack with respect to the bottom thereof or other disruption of the stack as a result of the deflection action of the guide means.

In connection with the foregoing object, it is another object of this invention to provide self-aligning apparatus of the type set forth wherein the article support means is movable among a home position and adjustment positions, and further including bias means urging the support means toward the home position thereof.

Another object of this invention is to provide self-aligning apparatus of the type set forth, which includes a support base carried by the elevator and fixed with respect thereto, friction-reducing means carried by the support base, and an article support platform carried by the friction-reducing means for generally horizontal low-friction movement with respect to the support base among the home position and adjustment positions.

In connection with the foregoing object, still another object of this invention is to provide self-aligning apparatus of the type set forth, which includes a stop means carried by the article support platform for engagement with the friction-reducing means to limit the extent of the horizontal movement of the article support platform from the home position with respect to the support base.

Yet another object of this invention is to provide a self-aligning apparatus of the type set forth, wherein the stop means includes two stop members connected to the article support platform and disposed for engagement with the friction-reducing means, and retaining means connected to the stop members for cooperation therewith and with the support base and the friction-reducing means to retain the article support platform in place on the friction-reducing means.

Further features of the invention pertain to the particular arrangement of the parts of the self-aligning apparatus whereby the above-outlined and additional operating features are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 4 is an enlarged front elevational view of the pan carrier assembly of the present invention illustrated in FIG. 3, with the home position of the movable platform illustrated in solid line and the adjustment positions illustrated in solid line and the adjustment positions illustrated in broken line;

FIG. 5 is a top plan view of the pan carrier assembly illustrated in FIG. 4;

FIG. 6 is an end elevational view of the pan carrier assembly illustrated in FIGS. 4 and 5, as viewed from the right-hand end thereof;

FIG. 7 is a further enlarged view in vertical section taken along the line 7—7 in FIG. 4;

FIG. 8 is a fragmentary front elevational view of the pan carrier assembly similar to FIG. 4, but with the bearing plate of the support base removed more clearly to show the internal construction of the pan carrier assembly and with the movable platform shown in an adjustment position; and FIG. 9 is a fragmentary rear elevational view of the pan carrier assembly illustrated in FIG. 4.

DESCRIPTION OF THE PREFERRED EMBODIMENT

Figure 1:
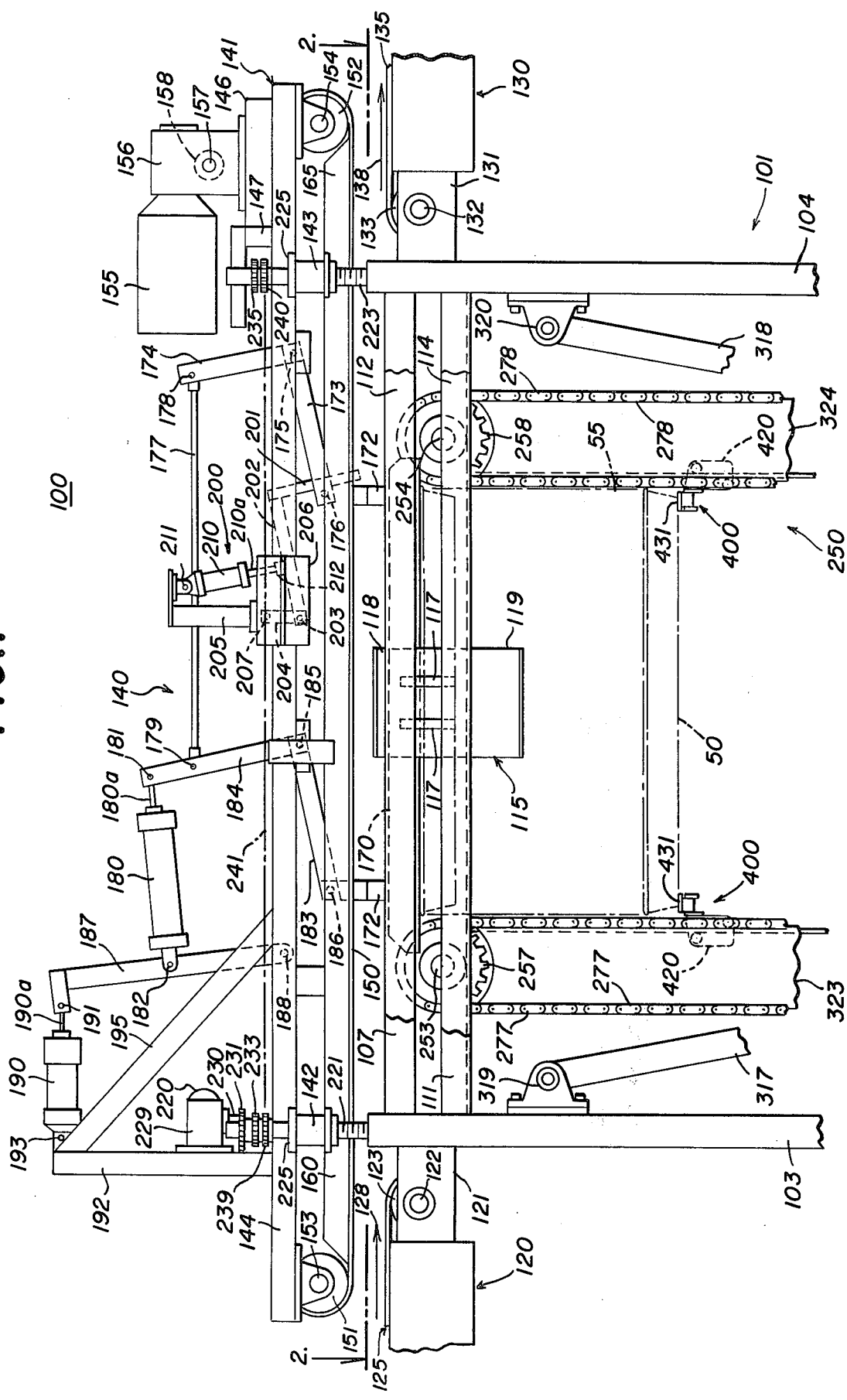
FIG. 1 is a fragmentary side elevational view of a stacking-unstacking machine including the self-aligning conveyor apparatus constructed in accordance with and embodying the features of the present invention, with portions of the machine broken away more clearly to show the present invention.
Figure 2:
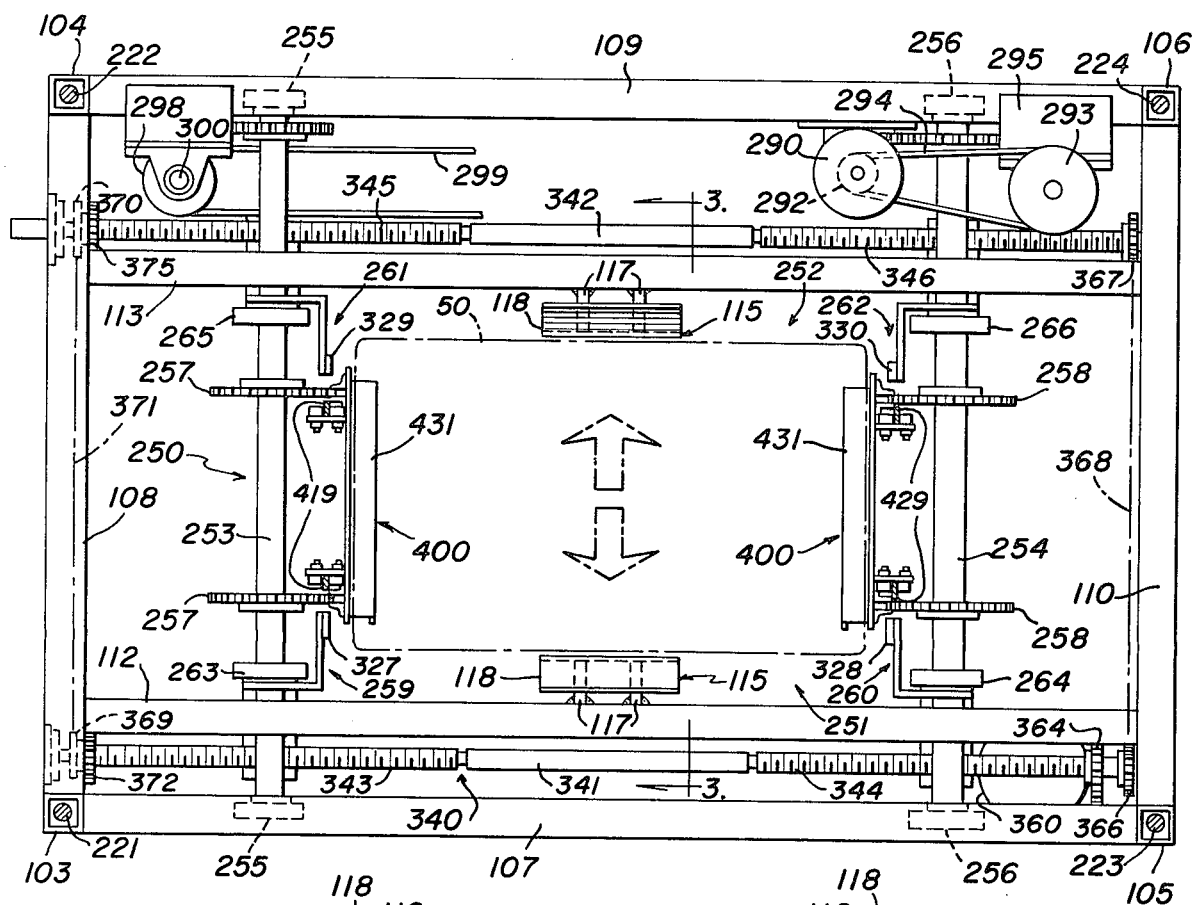
FIG. 2 is a view in horizontal section taken along the line 2—2 in FIG. 1, and illustrating the direction of movement of the pan stacks into and out of the conveying apparatus.

Referring now to FIGS. 1 and 2, there is disclosed a baking pan stacker-unstacker 100 for transporting baking pans 50 from an infeed conveyor 120 to an outfeed conveyor 130, the stacker-unstacker 100 being selectively operable in a stacking mode thereof to stack the baking pans 50 into a stack 55 and in an unstacking mode thereof to unstack individual baking pans from the stack and in a pass-through mode thereof to pass the baking pans from the infeed conveyor 120 to the outfeed conveyor 130. More particularly, the stacker-unstacker 100 includes a main frame 101 comprised of a base member (not shown) adapted to lie on a support surface such as the floor or the like. At the corners of the base member 102 there are provided four up-rights 103, 104, 105 and 106 extending vertically upwards of the base. The uprights 103 and 105 are interconnected by a horizontally disposed top frame member 107; the uprights 103 and 104 are interconnected by a horizontally disposed top frame member 108; the uprights 104 and 106 are interconnected by a horizontally disposed top frame member 109; and the uprights 106 and 105 are connected by a horizontally disposed top frame member 110. There is further provided a cross frame member 111 interconnecting the upright 103 with the upright 105 and like cross frame members (not shown) interconnecting the upright 103 with the upright 104, the upright 104 with the upright 106, and the upright 106 with the upright 105. Additional cross frame members (not shown) interconnect the uprights 103 and 104 and the uprights 105 and 106 closer to the base 102.

Interconnecting the top frame members 108 and 110 a slight distance inwardly of the top frame member 107 and substantially parallel thereto is an inner frame member 112, and interconnecting the top frame members 108 and 110 a slight distance inwardly of the top frame member 109 and substantially parallel thereto is an inner frame member 113. Respectively spaced below the inner frame members 112 and 113 substantially parallel thereto and in vertical alignment therewith are two inner frame members 114 and 116, which are respectively connected at the opposite ends thereof to suitable frame members (not shown).

Carried by the inner frame members 112, 113, 114 and 116 are two identically constructed guide plates, each generally designated by the numeral 115. Each of the guide plates 115 has a pair of rectangular gusset or attachment plates 117 extending from the rear surface thereof, the gusset plates 117 of one of the guide plates 115 being connected as by welding to the inner frame members 112 and 114, while the gusset plates 117 of the other guide plate 115 are connected as by welding to the inner frame members 113 and 116. Each of the guide plates 115 has a flat rectangular substantially vertically disposed guide surface 115a, the guide plates 115 being mounted so that the guide surfaces 115a thereof are disposed in facing relationship with each other, spaced apart a distance only slightly greater than the width of an associated baking pan. Each of the guide plates 115 is provided with an outturned rectangular top guide flange 118 having a guide surface 118a, and an outturned rectangular bottom guide flange 119 having a guide surface 119a.

The pan infeed conveyor 120 includes two parallel and spaced-apart frame members 121 (one shown) having two shafts 122 (one shown) journaled for rotation therein, the shafts 122 being longitudinally spaced apart. Each of the shafts 122 has a sheave 123 thereon around which passes an endless belt 125, the infeed conveyor transporting pans 50 in the direction of the arrow 128.

The outfeed conveyor 130 includes two spaced-apart frame members 131 (one shown) supporting two longitudinally spaced-apart shafts 132 (one shown) journaled for rotation with respect thereto. Each of the shafts 132 has a sleave 133 positioned thereon supporting an endless belt 135, the outfeed conveyor transporting pans 50 in the direction shown by the arrow 138.

There is further provided a transfer conveyor 140 having a frame 141 which includes two longitudinally spaced-apart and parallel end members 142 and 143 interconnected by two longitudinally extending and horizontally spaced-apart longitudinal members 144 (one shown), the longitudinal members 144 and 145 resting upon and fixedly secured to the end members 142 and 143. Each of the frame members hereinbefore described is preferably hollow and square in transverse cross section.

The transfer conveyor 140 includes a motor mounting plate 146 fixedly secured to one of the longitudinal members 144 and a cross member 147 interconnecting the members 144 adjacent to the outfeed conveyor 130. Two spaced-apart endless belts 150 (one shown) are supported by two horizontally spaced-apart pulleys 151 (one shown) adjacent to the infeed conveyor 120 and two horizontally spaced-apart pulleys 152 (one shown) adjacent to the outfeed conveyor 130, the pulleys 151 and 152 being aligned so as to provide two spaced-apart endless belts 150 in alignment with the infeed conveyor 120 and the outfeed conveyor 130. Each of the pulleys 151 is mounted on a shaft 153 and each of the pulleys 152 is mounted on a shaft 154, the shafts 153 and 154 being suitably journaled for rotation with respect to the frame 141. Mounted on the rear end of the shaft 154 is a sprocket (not shown). A drive motor 155 is connected to a gear reducer 156 which is supported by the motor mounting plate 146, the gear reducer having an output shaft 157 extending therefrom. A sprocket 158 is fixedly mounted on the shaft 157 and is interconnected to the sprocket which is mounted on the shaft 154 by means of a chain (not shown), thereby interconnecting the motor 155 with the endless belts 150.

A permanent magnet 160 is mounted intermediate the endless belts 150 and extends from near the pulleys 151 toward the center of the transfer conveyor 140, the magnet 160 being positioned between four spaced-apart guide channels (not shown) which also serve to guide the endless belts 150. Two spaced-apart return rollers (not shown) are positioned on a shaft (not shown) mounted on the frame members 144 and 145, the return rollers supporting the endless belts 150 in the upper reach of their path. A second fixed magnet 165 is positioned intermediate the two endless belts 150 near the pulleys 152 and also extends toward the center of the transfer conveyor 140. Both the magnets 160 and 165 are fixedly connected to the frame 141 and extend respectively from the infeed end and the outfeed end toward the center of the transfer conveyor 140 and terminate so as to leave a central opening therebetween.

A shiftable magnet is positioned in a magnet housing 170, which is mounted on four arms 172 (two shown), two of the arms 172 being positioned near each end of the magnet housing 171 and extending upwardly therefrom. Connected to the two arms 172 near the end of the magnet 170 adjacent to the magnet 165 are two crank arms 173 (one shown) which in turn are respectively connected to two crank arms 174 (one shown), the crank arms 174 and 173 being pivotally connected as at 175 and the arms 173 and 172 being pivotally connected as at 176. A tie rod 177 is pivotally connected to the two parallel crank arms 174 by a pivot shaft 178 and is also pivotally connected to a shaft 179 at the other end of the tie rod.

A motor 180 for the shiftable magnet 170 is provided in the form of an air cylinder having a piston 180a, the motor being pivotally connected to the mechanism hereinafter described at points 181 and 182. Two spaced-apart crank arms 183 (one shown) are each connected to a respective one of the arms 172 at the end of the magnet housing 171 near the magnet 160. The crank arms 183 are each connected to a respective one of two crank arms 184 (one shown), the crank arms 184 being connected to the crank arms 183 by two pivots 185 and the crank arms 183 being connected to the arms 172 by two pivots 186. The crank arms 184 are interconnected by the pivot shaft 179 thereby pivotally to connect the crank arms 184 to the tie rod 177. The crank arms 184 are also pivotally connected to the motor 180 and more particularly to the piston 180a thereof as at 181. A lever 187 is pivotally mounted to the frame 141 by a pivot 188, the lever 187 also being pivotally mounted to the motor 180 by the pivot 182.

A stacking-unstacking motor 190 is provided in the form of an air cylinder having a piston 190a extending therefrom, which piston is pivotally connected by a pivot 191 to the lever 187. The motor 190 is also pivotally connected to a support 192 by a pivot shaft 193, the support 192 being in the form of spaced-apart upwardly extending members interconnected by a cross member (not shown), which cross member is connected to the support 192 by means of a slant support 195.

A pan stop mechanism 200 is provided wherein two spaced-apart apart stop members 201 (one shown) are respectively fixedly connected to arms 202 (one shown), which arms 202 are pivoted as at 203 to a link 204 which in turn is pivotally mounted on a shaft 207. The shaft 207 is supported by a subframe 205 having a block 206 extending downwardly therefrom. A pan stop motor 210 is pivotally mounted on the subframe 205 by a pivot 211, the motor 210 having a shaft 210a pivotally connected to the arm 202 as at 212.

Referring to FIG. 1, there is shown a motor 220 for adjusting the height of the frame 141. There are also provided four screw shafts, one in each of the uprights of the frame 101, a screw shaft 221 extending upwardly from the upright 103, a screw shaft 222 entending upwardly from the upright 104, a screw shaft 223 extending upwardly from the upright 105 and a screw shaft 224 extending upwardly from the upright 106. Each of the screw shafts is provided with a flange bearing 225. It is seen, therefore, that the end members 142 and 143 of the frame 141 are connected to the flange bearings 225 and are movable therewith along the respective ones of the threaded shafts 221 to 224 thereby to raise and lower the transfer conveyor 140 with respect to the frame 101.

A gear reducer 229 is connected to the motor 220 and has an output shaft 230 extending therefrom. A sprocket 231 is fixedly mounted on the output shaft 230 of the gear reducer 229 and is connected by means of a chain (not shown) to a sprocket 233 fixedly mounted on the shaft 221. Another sprocket (not shown) is fixedly mounted on the shaft 222 and a sprocket 235 is fixedly mounted on the shaft 233 and another sprocket (not shown) is fixedly mounted on the shaft 224. A chain (not shown) interconnects the sprocket on the shaft 222 with the sprocket 223 on the shaft 221 and a chain (not shown) interconnects the sprocket on the shaft 224 with the sprocket 235 on the shaft 223. A sprocket 239 is fixedly mounted to the shaft 221 and a sprocket 240 is fixedly mounted on the shaft 223, the sprockets 239 and 240 being interconnected by a chain 241. It is seen, therefore, that the motor 220 is connected by means of the output shaft 230 and the chain 232 to each of the threaded shafts 221, 222, 223, and 224, the interconnection being by means of the hereinbefore mentioned sprockets and chains. Activation of the motor 220 resulting in rotation of the shaft 230 thereby causes the threaded shafts 221 to 224 to rotate thereby to raise or lower the frame 141 and thereby the transfer conveyor 140 with respect to the frame 101 in order to accommodate bread pans of various sizes, as hereinafter will be explained.

There is also disclosed an elevator 250 having an input side 251 and an output side 252. An upper shaft 253 near the input side 251 is spaced from and lies in the same plane as an upper shaft 254, the upper shaft 253 being journaled for rotation in bearings 255 and the upper shaft 254 being journaled for rotation in bearings 256. The bearings 255 and 256 are maintained between the top frame members 107 and 109 and the front cross frame members 111 and corresponding rear cross frame member, respectively. The shaft 253 has two spaced-apart sprockets 257 fixedly mounted thereto for rotation therewith and the shaft 254 also has two spaced-apart sprockets 258 fixedly mounted thereon for rotation therewith, the sprockets 257 and 258 being in registry. The shaft 253 has an upper sprocket shaft assembly 259 mounted thereon and opposite to an upper sprocket shaft assembly 260 mounted on the shaft 254. Similarly, on the other side of the sprockets 257 an upper sprocket shaft assembly 261 is mounted on the shaft 253 and opposite thereto on the shaft 254 is an upper sprocket shaft assembly 262. The upper sprocket shaft assembly 259 is fixedly mounted to a support block 263 which is mounted about the shaft 253 so as to remain fixed during rotation of the shaft. Similarly, support blocks 264, 265 and 266 are respectively associated with the upper shaft assemblies 260, 261 and 262.

Respectively vertically positioned below the shafts 253 and 254 are lower shafts (not shown), each being provided like the upper shafts 253 and 254, with sprockets and also being provided with bearings, all as is more fully described in the aforementioned U.S. Application Ser. No. 339,314. There are further provided two chains 277 respectively interconnecting the sprockets 257 on the shaft 253 with the corresponding sprockets on the corresponding lower shaft, and two chains 278 respectively interconnecting the sprockets 258 on the shaft 254 with the corresponding sprockets on the corresponding lower shaft.

An elevator drive motor 290 has an output shaft (not shown) extending therefrom to which a pulley 292 is fixedly connected. A chain 294 interconnects the pulley 292 with a pulley 293 which in turn is connected to a clutch brake assembly 295 having a shaft (not shown) extending vertically downwardly therefrom with a lower pulley fixedly mounted thereon, which pulley, shaft and clutch brake assembly 295 are all mounted adjacent to the upright 106. Adjacent to the upright 104 there is mounted a pulley 298 on a downwardly extending shaft 300, the pulley 298 being interconnected with the lower pulley of the clutch brake assembly 295 by a gear belt 299. It is seen, therefore, that activation of the motor 290 results in rotation of the output shaft thereof, of the shaft of the clutch brake assembly 295 and the shaft 300.

Gear reducers (not shown) are respectively positioned adjacent to the base near the uprights 104 and 106, and are provided with input shafts respectively coupled to the shaft 300 and the shaft of the clutch brake assembly 295. The gear reducers are also provided with output shafts provided with sprockets coupled by drive chains with corresponding sprockets on the rear ends of the shafts 253 and 254, all as is described in greater detail in the aforementioned U.S. Application Ser. No. 339,314.

A take-up arm 317 is pivotally mounted to the frame 101 as at 319 while a take-up arm on 318 is pivotally mounted to the frame at 320. The take-up arms 317 and 318 are respectively provided at the lower ends thereof with outer sprockets (not shown) adapted to engage the chains interconnecting the shafts 253 and 254 with the gear reducer output shafts. Chain guides 323 and 324 are mounted to insure that the chains 277 and 278 remain engaged with the sprockets 257 and 258 and with the corresponding lower sprockets. Each of the upper sprocket shaft assemblies 259, 260, 261 and 262 is provided with a respective one of four chain guides 327, 328, 329 and 330 thereby to maintain the bread pans 50 in position on the elevator 250 during movment of the stack 55 toward and away from the transfer conveyor 140. Finally, there is provided a conveyor (not shown) for removing stacked baking pans from the machine 100 or for bringing stacked baking pans into the machine 100, all as set forth in greater detail in the aforementioned U.S. Application Ser. No. 339,314.

An elevator length adjustment mechanism 340 includes an upper screw shaft 341 positioned intermediate the top frame member 107 and the upper sprocket shaft assemblies 259 and 260 and an upper screw shaft 342 positioned intermediate the top frame member 109 and the upper sprocket shaft assemblies 261 and 262. The upper screw shaft 341 has spaced-apart threaded sections 343 and 344 and the upper screw shaft 342 has spaced-apart threaded sections 345 and 346. The upper screw shaft 341 extends through support blocks (not shown) on the upper sprocket shaft assemblies 259 and 260 and is journaled for rotation in bearings. Similarly, the shaft 342 is also supported in support blocks (not shown) associated with the shaft assemblies 261 and 262, and is journaled for rotation within bearings. There are also provided two spaced-apart lower screw shafts (not shown) vertically disposed below the upper screw shaft 341 and two spaced-apart lower screw shafts vertically disposed below the upper screw shaft 342. The lower screw shafts are respectively maintained in blocks (not shown) thereby to mount the shafts.

An elevator length adjustment motor 360 is connected by means not shown to a sprocket 364 fixedly connected to the screw shaft 344. A drive sprocket 366 is fixedly mounted on the shaft 341 and is connected to a drive sprocket 367 fixedly mounted on the shaft 342 by a chain 368 extending therebetween. Another drive sprocket 369 is mounted on the end of the shaft 341 opposite to sprocket 366 and the sprocket 369 is interconnected with a drive sprocket 370 fixedly mounted on the shaft 342 by a chain 371 extending therebetween. A sprocket 372 is mounted on the threaded portion 343 of the shaft 341 and is interconnected by a chain to a sprocket fixedly mounted on the corresponding lower screw shaft in vertical alignment with the sprocket 372. Similarly, a sprocket 375 is fixedly mounted on the threaded portion 345 of the shaft 342 and is connected by a chain to a sprocket mounted on the corresponding lower screw shaft in vertical alignment with the sprocket 375. Finally, there is provided a counter (not shown) coupled to the output shaft 362 of the motor 360.

Following is an explanation of the mechanical operation of the system hereinbefore described. Both the infeed conveyor 120 and the outfeed conveyor 130 have independent drive mechanisms not shown which provide for movement of the endless belts 125 and 135 respectively in the direction of the arrows 128 and 138 respectively. The transfer conveyor 140 and more particularly the two spaced-apart conveyor belts 150 continuously move so that the lower reaches of the conveyor belts move from the infeed conveyor 120 to the outfeed conveyor 130. This movement of the conveyor belts 150 is provided by the drive motor 155 operatively connected by the chain 159 to the drive shaft 154, thereby to provide movement of the endless belts 150. It is noted that the pulleys 151 and 152 around which the endless belts 150 pass overlap the upper reaches of both the infeed conveyor 120 and the outfeed conveyor 130 thereby to provide for continuous movement therebetween.

As a pan 50 moves along the upper reach of the infeed conveyor 120 it eventually contacts the lower reach of the endless belts 150 and is held thereagainst by the permanent magnet 160, it being noted that the bottom surface of the permanent magnet 160 lies in a plane with the endless belts 150. The functional engagement between the belts 150 and the pan 50 provides for movement of the pan by the belts from the infeed conveyor 120 to the outfeed conveyor 130, permanent magnet 160, the shiftable magnet 170 and the permanent magnet 165 insuring continuous contact between the pan 50 and the endless belts.

The shiftable magnet 170 is movable between three positions depending upon the mode of operation of transfer conveyor 140 and more particularly the mode of operation of the stacker-unstacker 100. The stacker-unstacker 100 is constructed and arranged to operate in an unstacking mode wherein pans 50 are unstacked from a stack 60 of pans carried by the pan carrier, more particularly the elevator 250, and to operate in a pass-through mode wherein pans 50 are moved from the infeed conveyor 120 by the transfer conveyor 140 to the outfeed conveyor 130 and in a stacking mode wherein pans are moved from the infeed conveyor 120 to a position in registry with the pan carrier, movement of the pan being halted by the pan stop 200, and thereafter released so as to form a stack 60 of pans. In the unstacking mode, the pan stop 200 is in a retracted position thereof so that the stop members 201 are out of the path of the baking pans 50. The shiftable magnet 170 is in its lowest position wherein the magnet extends below the lower reach of the endless belts 150 and magnetically contacts the topmost pan 50 in the stack 60. Once the shiftable manget 170 is in magnetic contact with the pan 50 the motor 180 is actuated to move the shiftable magnet 170 to the center position, wherein the bottom surface of the shiftable magnet lies in the same plane as the bottom surfaces of the permanent magnets 160 and 165. In the central position, the endless belts 150 are in position to convey the pan 50 previously removed from the stack 60 to the outfeed conveyor 130.

The stacker-unstacker 100 operates in a pass-through mode wherein the bottom surfaces of the permanent magnets 160 and 165 lie in the same plane as the bottom surface of the shiftable magnet 170, thereby to insure magnetic coupling of a pan 50 onto the transfer conveyor 140 and more patricularly onto the lower reaches of the endless belts 150, and thence to the outfeed conveyor 130.

The stacker-unstacker 100 of the present invention is operable in a stacking mode when the pan stop 200 is in the stop position thereof to interpose stop members 201 in the path of the pan 50 being conveyed by the transfer conveyor 140. The piston 180A of the motor 180 and the piston 190A of the motor 190 are both extended to move the shiftable magnet 170 to its uppermost position with respect to the endless belts 150, thereby to provide mechanism for breaking the magnetic coupling between the pan 50 and the shiftable magnet 170. Movement of the shiftable magnet 170 to its uppermost position is effected subsequent to the positioning of the pan 50 in registry with the pan carrier by the pan stop 200. After each pan 50 is dropped into the stack 60 the elevator 250 indexes downwardly so as to be in position to receive the next pan 50, all as hereinafter will be set forth.

Since different bakery products require pans having different heights or depths, it is necessary to provide proper means for adjusting the distance between the lower reaches of the endless belts 150 and the upper reaches of the infeed conveyor 120 and the outfeed conveyor 130. There is provided the motor 220 for adjusting the height of the frame 141 of the transfer conveyor 140, the motor 220 being operatively connected to the shafts 221, 222, 223 and 224, activation of the motor and thereby the output shaft 221 thereof resulting in rotation of the threaded shafts hereinbefore mentioned, whereby the frame 140 is raised or lowered depending upon the direction of which the output shaft 221 rotates.

The elevator 250 provides incremental movement of pan carrier assemblies 400, described below, upwardly toward the transfer conveyor 140 when the stacker-unstacker 100 is in the unstacking mode thereof and provides incremental movement downwardly away from the transfer conveyor when the stacker-unstacker is in the stacking mode thereof and remains stationary when the stacker-unstacker is in the pass-through mode thereof. Vertical movement of the elevator 250 is provided by the drive motor 290 which is operatively connected to drive shafts and gear reducers, which in turn have output shafts operatively connected to the shafts 253 and 254 on which are fixedly mounted the sprockets 257 and 258. The pan carrier assemblies are respectively mounted on two spaced-apart chains 277 and two spaced-apart chains 278, the chains 277 interconnecting the sprockets 257 with their corresponding lower sprockets, and the chains 278 interconnecting the sprockets 258 with their corresponding lower sprockets. It is seen, therefore, that operation of the motor 290 will result in movement of the chains 277 and the chains 278 and the pan carrier assemblies respectively carried thereby upwardly toward the transfer conveyor or downwardly and away from the transfer conveyor depending on the direction of rotation of the motor 290. The incremental movement of the elevator 250 is provided in part by the clutch brake assembly 295.

The elevator 250 is constructed and arranged to accommodate baking pans and the like having different lengths or widths. To this end, the length adjustment mechanism 340 and the motor 360 therefor have been provided. Operation of the motor 360 results in rotation of the threaded shafts 341 and 342, thereby to move the shafts 253 and 254 toward and away from one another as desired to accommodate baking pans 50 of various widths or lengths, the take-up arms 317 and 318 serving to maintain the proper tension on the chains interconnecting the gear reducers with the respective shafts 253 and 254.

With the exception of the inner frame members 112, 113 and 114 and 116 and the guide plates 115, all of the above-described apparatus is the same as that disclosed in the aforementioned U.S. application Serial No. 339,314, and the same reference numbers which were used in that application are used herein to designate the same structure. That application may be referred to for a more complete description of the structure and operation of the above-described apparatus.

Referring now also to FIGS. 3 through 9 of the drawings, the present invention resides principally in the provision of improved pan carrier assemblies, generally designated by the numeral 400, for use with the stacker-unstacker 100. At least one of the pan carrier assemblies 400 is mounted between the drive chains 277 and at least one of the pan carrier assemblies 400 is mounted between the drive chains 278. The pan carrier assemblies 400 are intended for use in substitution for the pan carriers 281 through 284 disclosed in the aforementioned U.S. Application Ser. No. 339,314, and it will be appreciated that more than one of the pan carrier assemblies 400 may be mounted on each pair of chains 277 and 278. The pan carrier assemblies 400 are identical in construction and, therefore, only one of the pan carrier assemblies will be described in detail.

Figure 3:
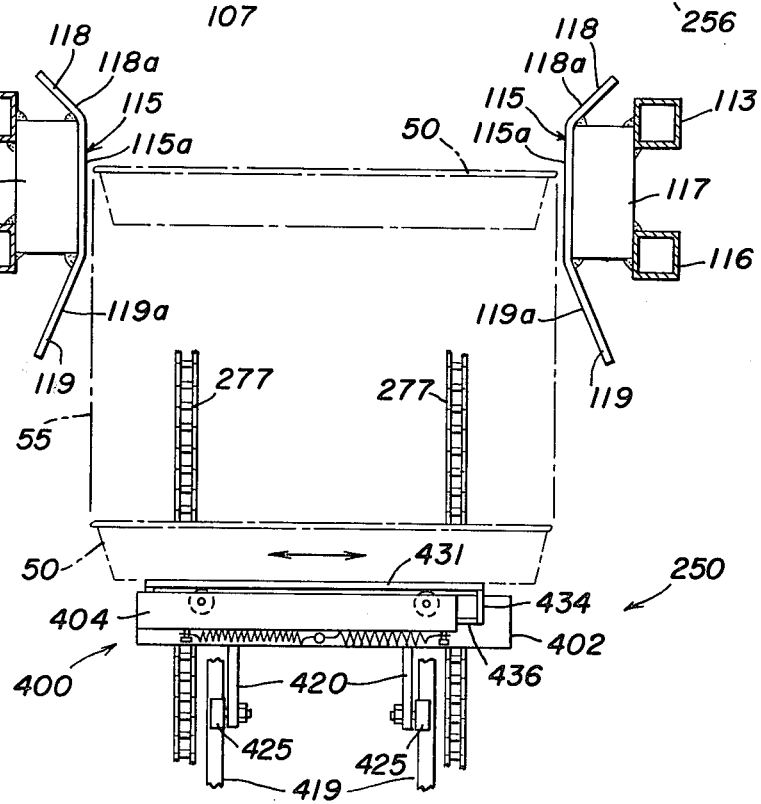
FIG. 3 is a fragmentary view in vertical section taken along the line 3—3 in FIG. 2, and illustrating the direction of movement of the movable platform of the pan carrier assembly of the present invention.

The pan carrier assembly 400 includes a base, generally designated by the numeral 401, which comprises an elongated rectangular mounting plate 402 disposed in use substantially vertically when the pan carrier assembly 400 is in the position illustrated in FIGS. 1 through 3, i.e., mounted on the elevator chains 277 or 278, toward the inside of the elevator 250 intermediate the upper and lower ends thereof. Fixedly secured as by welding to the mounting plate 402 adjacent to the upper edge thereof, and extending therefrom substantially normal thereto inwardly of the elevator 250 is a rectangular connecting plate 403 having a length substantially less than the length of the mounting plate 402 and being centered between the ends thereof. Fixedly secured as by welding to the distal edge of the connecting plate 403, and extending downwardly therefrom substantially parallel to the mounting plate 402 is an elongated rectangular journal plate 404, the length and width of which are respectively slightly less than the length and width of the mounting plate 402.

Disposed between the mounting plate 402 and the journal plate 404 adjacent to one end thereof and mounted for free rotation on a horizontal shaft 405 are a pair of roller bearings 406, the opposite ends of the shaft 405 being respectively received in complementary openings in the mounting plate 402 and the journal plate 404 and being disposed substantially perpendicular thereto. In like manner, disposed between the mounting plate 402 and the journal plate 404 adjacent to the other end thereof and mounted for free rotation on a horizontal shaft 407 are a pair of roller bearings 408, the opposite ends of the shaft 407 also being received in complementary openings in the mounting plate 402 and the journal plate 404 and being substantially perpendicular thereto. The roller bearings 406 and 408 are so mounted that a common plane tangent to the cylindrical surfaces thereof at the top thereof is disposed a slight distance above the upper edges of the mounting plate 402 and the journal plate 404 substantially parallel to the connecting plate 403, for a purpose to be described more fully below.

While, in the preferred embodiment of the invention, roller bearings have been disclosed for supporting the movable platforms 430, it will be understood that other types of bearings or low-friction mountings could be used.

Mounted on the rear surface of the mounting plate 402 are two pairs of mounting brackets 410, one pair being disposed adjacent to one end of the mounting plate 402 and the other pair being disposed adjacent to the other end of the mounting plate 402. The mounting brackets 410 of each pair are identically constructed, each including an attachment flange 411 fixedly secured to the mounting plate 402, and a mounting flange 412 extending rearwardly from the attachment flange 411 substantially perpendicular thereto. In use, the two pairs of mounting brackets 410 are disposed respectively for engagement with the pair of elevator chains 277 (or 278). The mounting flanges 412 of each pair of mounting brackets 410 are spaced apart to be received over a link of the corresponding chain, with the link pins being received in complementary openings in the mounting flanges 412 for securely mounting the pan carrier assembly 400 on the elevator chains 277 (or 278).

Also fixedly secured as by welding to the rear or inner surface of the mounting plate 402, respectively just inside the two pairs of mounting brackets 410, are two guide plates 420 which extend from the mounting plate 412 substantially normal thereto. Carried by each of the guide plates 420 adjacent to the upper end and the rear edge thereof is a guide roller 421 mounted for free rotation on a shaft 422 which extends through a complementary opening in the guide plate 420 and is threaded at the other end thereof to be held in place by a washer 423 and a nut 424. Carried by each of the guide plates 420 adjaceent to the lower end and the front edge thereof is another guide roller 425 mounted for free rotation on a shaft 426 which extends through another complementary opening in the guide plate 420 and has the other end thereof externally threaded to be held in place by means of a washer 427 and a nut 428.

Vertically extending respectively adjacent to the inner reaches of the two elevator chains 277 are two guide rails 419, and vertically extending respectively adjacent to the inner reaches of the two elevator chains 278 are two guide rails 429. In use, the guide rails of each pair of guide rails 419 and 429 are respectively disposed between the guide rollers 421 and 425 of the adjacent guide plate 420 for cooperation therewith to guide the vertical movement of the pan carrier assemblies 400 by the elevator 250 and prevent lateral swaying of the pan carrier assemblies 400 by reason of any slack in the elevator chains 277 or 278.

Carried by the base 401 is a movable platform, generally designated by the numeral 430, and including an elongated rectangular support plate 431 having a length slightly less than the length of the journal plate 404 and being disposed in use above the base 401 for rolling engagement with the roller bearings 406 and 408. Preferably, the width of the support plate 431 is such that is extends from adjacent to the front surface of the mounting plate 402 and overlies the upper edge of the journal plate 404. The upper surface 432 of the support plate 431 defines a support surface for supporting baking pans or the like thereon. Fixedly secured as by welding to the support plate 431 respectively adjacent to the opposite ends thereof and extending downwardly therefrom substantially perpendicular thereto are two rectangular end or stop plates 433 and 434, which are respectively connected as by welding adjacent to the lower ends thereof to two inwardly extending rectangular retaining plates 435 amd 436.

The retaining plates 435 and 436 are disposed substantially parallel to the support plate 431 and extend respectively beneath the adjacent pairs of roller bearings 406 and 408 closely adjacent thereto, the length of the retaining plates 435 and 436 being such as to prevent removal of the movable platform 430 from the base 401 either by lifting the movable platform 430 vertically or rolling it until one end wall engages the adjacent roller bearings (see FIG. 8). Additionally, the end plates 433 and 434 and the retaining plates 435 and 436 move between the mounting plate 402 and bearing plate 404 and cooperate therewith to prevent sidewise horizontal movement of the movable platform 430 in directions parallel to the axes of the bearing shafts 405 and 407. It will be understood that, in use, the movable platform 430 is movable horizontally in the direction of the arrow between the solid line home position and broken line adjustment positions illustrated in FIG. 4, the end plates 433 and 434 serving to limit this horizontal movement of the platform 430.

Threadedly engaged with the mounting plate 402 centrally of the outer surface thereof adjacent to the lower edge thereof is an anchor screw 437, and respectively threadedly engaged with the retaining plates 435 and 436 and extending downwardly therefrom are anchor screws 438 and 439. A tension spring 440 extends between the anchor screws 437 and 438, while a tension spring 441 extends between the anchor screws 437 and 439, the tension springs 440 and 441 serving to resiliently urge the movable platform 430 toward the solid line or home position thereof illustrated in FIG. 4 with just enough force to move the movable platform 430 to its home position from an adjustment position.

In operation, two of the pan carrier assemblies 400 are respectively mounted between the inner reaches of the drive chains 277 and the inner reaches of the drive chains 278, in position so that the support surfaces 432 of the movable platforms 430 are in the same horizontal plane. The pan carrier assemblies 400 are spaced apart by the elevator width adjustment mechanism a distance appropriate for accommodating the size of pans to be handled, so that opposite side edges of the pans 50 may respectively be supported on the support surfaces 432 of the movable platforms 430.

The stacks 55 of pans 50 are conveyed to the elevator 250 by means not shown, which move the stack 55 onto the movable platforms 430 from the front of the stacker-unstacker 100, as viewed in FIG. 1, in a direction generally perpendicular to the direction of travel of pans 50 along the conveyors 120, 130 and 140. However, it is difficult accurately to position the stack 55 on the movable platforms 430 and, therefore, sometimes a stack 55 may be pushed too far into or not far enough into the elevator 250 so that the stack is not centered on the movable platforms 430, or one side of the stack may be pushed in further than the other side of the stack, so that the stack 55 is rotated slightly so as not to be "square" with respect to the elevator 250 when the stack 55 is picked up by the pan carrier assemblies 400. Any such misplacements of the stack 55 on the pan carrier assemblies 400 may result in preventing the proper functioning of the stacker-unstacker 100 in the unstacking mode thereof.

Accordingly, there have been provided the guide plates 115, the bottom guide flanges 119 of which serve to engage and deflect the uppermost pan 50 of a misaligned stack 55 and guide the pan 50 into proper alignment for unstacking at the unstacking station at the top of the elevator 250. It will, of course, also be recognized that the top guide flanges 118 of the guide plates 115 also serve to guide the pans 50 as they are dropped from the transfer conveyor 140 during a stacking mode operation of the stacker-unstacker 100.

Since the pans 50 are nested or stacked, it will be understood that when the uppermost pan 50 in a misaligned stack 55 is deflected and guided into proper position by the guide plates 115, this aligning thrust and movement will be resisted by the rest of the stack 55 and there may, therefore, be considerable internal stresses developed within the stack 55. If the stack 55 is sufficiently misaligned, the lateral thrust of the guide plates 115 could serve to upset the stack or to cause an undersirable displacement of the top portion of the stack with respect to the bottom portion thereof.

However, it is a significant feature of the present invention, that the movable platforms 430 of the pan carrier assemblies 400 serve to permit a horizontal translational movement of the entire stack 55 by the guide plates 115, so as to move the entire stack 55 into proper alignment and prevent any undesirable disruption of the stack. Thus, it will be appreciated, that the lateral thrust exerted upon the stack 55 by the guide plates 115 is transmitted through the stack 55 to the movable platforms 430 of the pan carrier assemblies 400, and serve to move the movable platforms 430 against the urging of the tension springs 440 and 441, in amounts sufficient to bring the entire stack into proper alignment, and to relieve internal stresses within the stack 55.

If, for example, the stack 55 is inserted too far or not far enough into the elevator 250, the appropriate guide plate 115 will engage the uppermost pan in the stack and move the entire stack and the movable platforms 430 horizontally as indicated by the arrows in FIGS. 3 and 4 in a direction to an adjustment position (see FIG. 8, for example) to bring the stack 55 back into proper alignment. Similarly, if the stack 55 is rotated with respect to the elevator 250, one guide plate 115 will engage the top of the stack on one side thereof adjacent to one end thereof, while the other guide plate will engage the top of the stack along the other side thereof adjacent to the other end thereof, to impart a rotational movement to the stack 55 and the movable platforms 430, thereby moving one movable platform 430 in one direction and the other movable platform 430 in the other direction to bring the stack 55 back into proper alignment.

The stack-aligning movements of the movable platforms 430 are resisted slightly by the force of the tension springs 440 and 441, which force is just sufficient to return the movable platforms 430 to their home position, illustrated in solid line in FIG. 4, after the bottom pan 50 of the stack 55 has been unstacked from the pan carrier assemblies 400 and the aligning thrust from the guide plates 115 is removed.

From the foregoing, it can be seen that there has been provided an improved stacker-unstacker for bakery pans and the like, which includes a self-aligning elevator apparatus for insuring that stacks of pans are maintained in proper alignment for the unstacking operation, without disruption of the stack or undue buildup of internal stresses therein.

There has also been provided a self-aligning apparatus for a stacker-unstacker of the character described, which includes guide means for properly aligning articles in a misaligned stack, and an elevator having article support means which are horizontally movable in response to forces imparted by the guide means, to permit movement of the entire stack into proper alignment.

More particularly, there has been provided a pan carrier assembly for a stacker-unstacker, which includes a base and a movable platform carried by the base for low-friction rolling movement with respect thereto to accommodate movement of a stack carried thereby into proper alignment by associated guide means.

There has also been provided a self-aligning apparatus of the character described, which includes stop means for limiting the horizontal movement of the movable platform, and bias means for urging the movable platform to a home or rest position.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Self-aligning apparatus for moving stackable articles to an unstacking station comprising an elevator, article support means carried by said elevator for generally horizontal movement with respect thereto, said support means being disposed below said unstacking station for supporting a stack of articles, said elevator moving said support means upwardly and toward the unstacking station to permit unstacking of articles from said support means at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said support means effecting a corresponding horizontal movement of said support means, whereby the entire stack is moved into proper alignment with respect to the unstacking station so as to prevent displacement of the top of the stack with respect to the bottom thereof or other disruption of the stack as a result of the deflecting action of said guide means.

2. The apparatus set forth in claim 1, wherein said stackable articles comprise baking pans.

3. The apparatus set forth in claim 1, wherein said guide means includes two spaced-apart guide plates respectively disposed for engagement with opposite side edges of the articles in the stack.

4. The apparatus set forth in claim 1, wherein said guide means includes two spaced-apart guide plates respectively disposed for engagement with opposite side edges of the articles in the stack, each of said guide plates having a vertical guide surface and an inclined guide surface extending downwardly and outwardly from said vertical surface.

5. The apparatus set forth in claim 1, wherein said article support means includes a pair of laterally spaced-apart article support assemblies disposed for respectively supporting opposite ends of an article or a stack of articles.

6. Self-aligning apparatus for moving stackable articles to an unstacking station comprising an elevator, article support means carried by said elevator for generally horizontal movement with respect thereto among a home position and adjustment positions, bias means urging said support means toward the home position thereof, said support means being disposed below said unstacking station for supporting stack of articles, said elevator moving said support means upwardly and toward the unstacking station to permit unstacking of articles from said support means at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said support means effecting a corresponding horizontal movement of said support means to an adjustment position against the urging of said bias means, whereby the entire stack is moved into proper alignment with respect to the unstacking station so as to prevent displacement of the top of the stack with respect to the bottom thereof or other disruption of the stack as a result of the deflecting action of said guide means.

7. The apparatus set forth in claim 6, wherein said bias means includes a tension spring.

8. The apparatus set forth in claim 6, wherein said bias means includes two tension springs, one of said tension springs urging said article support means toward the home position thereof from a first range of adjustment positions in a first direction from said home position, the other of said tension springs urging said article support means toward the home position thereof from a second range of adjustment positions in an opposite direction from said home position.

9. Self-aligning apparatus for moving stackable articles to an unstacking station comprising an elevator, a support base carried by said elevator and fixed with respect thereto, friction-reducing means carried by said support base, an article support platform carried by said friction-reducing means for generally horizontal low-friction movement with respect to said support base among a home position and adjustment positions, said article support platform being disposed below said unstacking station for supporting a stack of articles, said elevator moving said article support platform upwardly and toward the unstacking station to permit unstacking of articles from said article support platform at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said article support platform effecting a corresponding horizontal movement of said article support platform on said friction-reducing means with respect to said support base to an adjustment position, whereby the entire stack is moved into proper alignment with respect to the unstacking station so as to prevent displacement of the top of the stack with respect to the bottom thereof or other disruption of the stack as a result of the deflecting action of said guide means.

10. The apparatus set forth in claim 9, wherein said article support platform has an elongated rectangular support surface disposed substantially horizontally in use for supporting a stack of articles thereon.

11. The apparatus set forth in claim 9, wherein said friction-reducing means comprises roller bearings.

12. Self-aligning apparatus for moving stackable articles to an unstacking station comprising an elevator, a support base carried by said elevator and fixed with respect thereto, friction-reducing means carried by said support base, an article support platform carried by said friction-reducing means for generally horizontal low-friction movement with respect to said support base among a home position and adjustment positions, stop means carried by said article support platform for engagement with said friction-reducing means to limit the extent of the horizontal movement of said article support platform from said home position with respect to said support base, said article support platform being disposed below said unstacking station for supporting a stack of articles, said elevatorr moving said article support platform upwardly and toward the unstacking station to permit unstacking of articles from said article support platform at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said article support platform effecting a corresponding horizontal movement of said article support platform on said friction-reducing means with respect to said support base to an adjustment position, whereby the entire stack is moved into proper alignment with respect to the unstacking station so as to prevent displacement of the top of the stack with respect to the bottom thereof or other disruption of the stack as a result of the deflecting action of said guide means.

13. The apparatus set forth in claim 12, wherein said stop means comprises two spaced-apart stop members connected to said article support platform for respectively engaging said friction-reducing means adjacent to opposite ends of said support platform, one of said stop members cooperating with said friction-reducing means to limit horizontal movement of said article support platform in one direction, the other of said stop members cooperating with said friction-reducing means to limit horizontal movement of said article support platform in the opposite direction.

14. The apparatus set forth in claim 12, wherein said article support platform is adapted for movement on said friction-reducing means only in predetermined opposite directions along a predetermined straight-line path, said support base including two plates disposed in use on opposite sides of said stop means and cooperating therewith to prevent horizontal movement of said article support platform in directions other than said predetermined directions.

15. The apparatus set forth in claim 12, wherein said friction-reducing means includes two sets of roller bearings respectively disposed adjacent to opposite ends of said support base, said stop means including two stop members respectively disposed for engagemeent with said two sets of roller bearings.

16. Self-aligning apparatus for moving stackable articles to an unstacking station comprising an elevator, a support base carried by said elevator and fixed with respect thereto, friction-reducing means carried by said support base, an article support platform carried by said friction-reducing means for generally horizontal low-friction movement with respect to said support base among a home position and adjustment positions, bias means coupled between said support base and said article support platform for urging said article support platform toward the home position thereof, said article support platform being disposed below said unstacking station for supporting a stack of articles, said elevator moving said article support platform upwardly and toward the unstacking station to permit unstacking of articles from said article support platform at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said article support platform effecting a corresponding horizontal movement of said article support platform on said friction-reducing means with respect to said support base to an adjustment position against the urging of said bias means, whereby the entire stack is moved into proper alignment with respect to the unstacking station so as to prevent displacement of the top of the stack with respect to the bottom thereof or other disruption of the stack as a result of the deflecting action of said guide means.

17. The apparatus set forth in claim 16, wherein said bias means includes two tension springs, one of said tension springs being coupled between said article support platform and a point on said support base adjacent to one end thereof, the other of said tension springs being coupled between said article support platform and a point on said support base adjacent to the other end thereof, movement of said article support platform from its home position in a direction toward one end of said support base being against the urging of the tension spring coupled to the other end of said support base.

18. Self-aligning apparatus for moving stackable articles to an unstacking station comprising an elevator, a support base carried by said elevator and fixed with respect thereto, friction-reducing means carried by said support base, an article support platform carried by said friction-reducing means for generally horizontal low-friction movement with respect to said support base among a home position and adjustment positions, bias means coupled between said support base and said article support platform for urging said article support platform toward the home position thereof, two stop members connected to said article support platform and disposed for engagement with said friction-reducing means to limit the extent of the horizontal movement of said article support platform from said home position with respect to said support base, retaining means connected to said stop members for cooperation therewith and with said support base and said friction-reducing means to retain said article support platform in place on said friction-reducing means, said article support platform being disposed below said unstacking station for supporting a stack of articles, said elevator moving said article support platform upwardly and toward the unstacking station to permit unstacking of articles from said article support platform at the unstacking station, and guide means mounted adjacent to the unstacking station for engagement with articles at the top of a misaligned stack as they are moved to the unstacking station by said elevator for deflecting and horizontally moving the articles properly to align them with respect to the unstacking station, the horizontal movement by said guide means of the articles at the top of the misaligned stack on said article support platform effecting a corresponding horizontal movement of said article support platform on said friction-reducing means with respect to said support base to an adjustment position against the urging of said bias means, whereby the entire stack is moved into proper alignment with respect to the unstacking station so as to prevent displacement of the top of the stack with respect to the bottom thereof or other disruption of the stack as a result of the deflecting action of said guide means.

19. The apparatus set forth in claim 18, and further including a guide assembly carried by said support base and disposed for cooperation with an associated guide rail to prevent horizontal movement of said support base.

* * * * *